United States Patent
Kim et al.

(10) Patent No.: US 12,539,847 B2
(45) Date of Patent: Feb. 3, 2026

(54) DRIVING CONTROL APPARATUS AND A METHOD THEREOF

(71) Applicants: HYUNDAI MOTOR COMPANY, Seoul (KR); KIA CORPORATION, Seoul (KR)

(72) Inventors: Il Hwan Kim, Hwaseong-si (KR); Kyung Joo Bang, Hwaseong-si (KR); Jae Woong Hwang, Seoul (KR); Dong Hyuk Kim, Hanam-si (KR); Jeong Ki Hong, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 83 days.

(21) Appl. No.: 18/536,988

(22) Filed: Dec. 12, 2023

(65) Prior Publication Data

US 2025/0065866 A1    Feb. 27, 2025

(30) Foreign Application Priority Data

Aug. 24, 2023    (KR) .......................... 10-2023-0111399

(51) Int. Cl.
*B60W 30/09*    (2012.01)
*B60W 10/18*    (2012.01)
(Continued)

(52) U.S. Cl.
CPC ............ *B60W 30/09* (2013.01); *B60W 10/18* (2013.01); *B60W 30/0956* (2013.01);
(Continued)

(58) Field of Classification Search
CPC ...... B60W 30/09; B60W 30/16; B60W 30/18; B60W 30/182; B60W 30/18072;
(Continued)

(56) References Cited

U.S. PATENT DOCUMENTS

| 9,495,874 | B1 * | 11/2016 | Zhu | .................. G08G 1/096741 |
| 11,760,321 | B2 * | 9/2023 | Kim | .......................... B60T 7/22 |
| | | | | 701/70 |

(Continued)

FOREIGN PATENT DOCUMENTS

| JP | 2018135003 A | 8/2018 |
| KR | 20220089740 A | 6/2022 |

*Primary Examiner* — Logan M Kraft
*Assistant Examiner* — Johnny H Hoang
(74) *Attorney, Agent, or Firm* — Lempia Summerfield Katz LLC

(57) ABSTRACT

A driving control apparatus includes a sensor device, a memory, and a controller. The driving control apparatus identifies at least one of a driving situation of an ego vehicle, driving information of the ego vehicle, or any combination thereof, using the sensor device; performs coasting control of the ego vehicle based on a first driving mode, when the at least one of the driving situation, the driving information, or the any combination thereof meets a specified condition; identifies risk information including at least one of at least one time to collision (TTC), a timegap with a forward vehicle, a relative speed to the forward vehicle, or any combination thereof; and determines whether to switch a driving mode to a second driving mode or a third driving mode including braking control, based on the result of comparing the risk information with a threshold.

17 Claims, 7 Drawing Sheets

(51) Int. Cl.
*B60W 30/095* (2012.01)
*B60W 30/18* (2012.01)
*B60W 30/182* (2020.01)

(52) U.S. Cl.
CPC .............................. *B60W 30/18072* (2013.01); *B60W 30/18109* (2013.01); *B60W 30/182* (2013.01); *B60W 2554/802* (2020.02); *B60W 2554/804* (2020.02)

(58) Field of Classification Search
CPC ....... B60W 30/18109; B60W 30/0956; B60W 2520/10; B60W 2554/804; B60W 2554/802; B60Q 1/00; B60Q 23/00; G08B 23/00
USPC ...................................................... 701/70–80
See application file for complete search history.

(56) References Cited

U.S. PATENT DOCUMENTS

| | | |
|---|---|---|
| 2007/0032914 A1* | 2/2007 | Kondoh ................ B60W 50/16 |
| | | 701/1 |
| 2018/0052463 A1 | 2/2018 | Mays |
| 2022/0126864 A1* | 4/2022 | Moustafa ................ H04W 4/46 |
| 2022/0144310 A1* | 5/2022 | Hong .............. B60W 30/18072 |
| 2022/0289176 A1* | 9/2022 | Baek ...................... B60W 30/09 |
| 2022/0297699 A1* | 9/2022 | Kim ........................ H04W 4/06 |
| 2023/0047479 A1* | 2/2023 | Remäng ................ B60W 40/08 |

* cited by examiner

DRIVING CONTROL APPARATUS AND A METHOD THEREOF

CROSS-REFERENCE TO RELATED APPLICATION

This application claims the benefit of and priority to Korean Patent Application No. 10-2023-0111399, filed in the Korean Intellectual Property Office on Aug. 24, 2023, the entire contents of which are incorporated herein by reference.

TECHNICAL FIELD

The present disclosure relates to a driving control apparatus and a method thereof and more particularly, relates to technologies of performing driving control based on a risk of collision determined using pieces of information about a driving situation of an ego vehicle.

BACKGROUND

The statements in this section merely provide background information related to the present disclosure and may not constitute prior art.

With the development of technology, various algorithms for performing driving control for an ego vehicle have been developed. For example, a driving control apparatus may perform an ego vehicle control algorithm divided into partial autonomous driving, conditional autonomous driving, high autonomous driving, and/or full autonomous driving depending on its control level.

For example, while controlling the driving of the ego vehicle, the driving control apparatus (or an autonomous driving control apparatus) may identify a risk of collision with an external object, based on a headway distance from a forward vehicle in front of the ego vehicle and/or a following vehicle behind the ego vehicle or information about the road on which the ego vehicle is traveling. The driving control apparatus may control at least one of a driving speed of the ego vehicle, driving acceleration of the ego vehicle, a driving direction of the ego vehicle, or any combination thereof based on the identified risk of collision.

For example, the driving control apparatus may identify a risk distance based on a headway distance from the forward vehicle in front of the ego vehicle and/or the following vehicle behind the ego vehicle and may control a braking device (e.g., a brake) based on a magnitude of a risk distance. The driving control apparatus may also determine whether to activate coasting control and may control a driving speed of the ego vehicle.

However, because the above-mentioned risk avoidance scheme determines the risk of collision using the pieces of primary information such as the headway distance or the information of the road, when determining the risk of collision by further using other parameters such as a relative speed to another vehicle or a time to collision (TTC), unnecessary braking control is performed based on only a simple result in which the headway distance is close even though it is a non-dangerous situation.

SUMMARY

The present disclosure has been made to solve the above-mentioned problems occurring in the prior art while advantages achieved by the prior art are maintained intact.

An aspect of the present disclosure provides a function for identifying at least one of a driving situation of an ego vehicle, driving information of the ego vehicle, or any combination thereof using a sensor device and performing coasting control based on whether the pieces of identified information meet a specified condition.

Another aspect of the present disclosure provides a driving control apparatus for identifying risk information including at least one of at least one TTC, a timegap with a forward vehicle, a relative speed to the forward vehicle, or any combination thereof and selectively performing various types of braking control based on the result of comparing the identified risk information with a threshold.

Another aspect of the present disclosure provides a driving control apparatus for determining a magnitude of required deceleration or whether to activate braking control based on at least one of a TTC, a timegap, a relative speed, or any combination thereof, when identifying that a situation requiring relatively high required deceleration occurs, while performing general driving control for an ego vehicle.

Another aspect of the present disclosure provides a driving control apparatus for determining a lower limit of required deceleration for braking control, based on various types of TTCs identified using different types of parameters.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a driving control apparatus may include a sensor device, a memory storing at least one instruction, and a controller operatively connected to the sensor device and the memory. For example, the at least one instruction may be configured to, when executed by the controller, cause the driving control apparatus to: identify at least one of a driving situation of an ego vehicle, driving information of the ego vehicle, or any combination thereof, using the sensor device; and perform coasting control of the ego vehicle based on a first driving mode, when the at least one of the driving situation or the driving information, or the any combination thereof meets a specified condition. The at least one instruction may be further configured to, when executed by the controller, cause the driving control apparatus to: identify risk information including at least one of at least one time to collision (TTC), a timegap with a forward vehicle, a relative speed to the forward vehicle, or any combination thereof; and determine whether to switch a driving mode to a second driving mode or a third driving mode including braking control, based on a result of comparing the risk information with a threshold.

According to an embodiment, the at least one instruction may be configured to, when executed by the controller, cause the driving control apparatus to identify that the at least one of the driving situation or the driving information, or the any combination thereof meets the specified condition, when identifying at least one situation of a cut-in situation in which a first other vehicle enters in front of the ego vehicle, an override activation situation of the ego vehicle, a situation in which an operation of the driving control apparatus is activated or resumed in a situation where there is a second other vehicle within a specified distance in front of the ego vehicle, a situation in which a setting value of a target headway distance increases, or any combination thereof.

According to an embodiment, the at least one TTC may include a first TTC identified based on a relative distance between the ego vehicle and another vehicle presenting in front of the ego vehicle and the relative speed. The at least one TTC may also include a second TTC identified based on the relative distance, the relative speed, and a relative acceleration between the ego vehicle and the other vehicle.

According to an embodiment, the at least one instruction may be configured to, when executed by the controller, cause the driving control apparatus to determine whether to switch the driving mode based on a result of comparing the second TTC with a reference TTC, when the relative speed is greater than or equal to a specified speed.

According to an embodiment, the at least one instruction may be configured to, when executed by the controller, cause the driving control apparatus to perform the braking control for the ego vehicle based on the second driving mode in which first required deceleration is minimum deceleration and acceleration for the braking control, i) when the timegap is smaller than a first reference timegap and the relative speed is smaller than a first reference relative speed, ii) when the at least one TTC is smaller than a first reference TTC, iii) when the timegap is smaller than a second reference timegap greater than the first reference timegap, the at least one TTC is smaller than a second reference TTC greater than the first reference TTC, and the relative speed is smaller than a first emergency relative speed smaller than the first reference relative speed, or iv) when a driving speed of the ego vehicle increases while performing the coasting control.

According to an embodiment, the at least one instruction may be configured to, when executed by the controller, cause the driving control apparatus to, while performing the coasting control or performing the braking control based on the second driving mode, perform the braking control for the ego vehicle based on the third driving mode in which second required deceleration is minimum deceleration and acceleration for the braking control, i) when the timegap is smaller than a third reference timegap and the relative speed is smaller than a second reference relative speed, ii) when the at least one TTC is smaller than a third reference TTC, or iii) when the relative speed is smaller than a second emergency relative speed.

According to an embodiment, the first reference timegap may be greater than the third reference timegap. The first reference relative speed may be greater than the second reference relative speed. The first reference TTC may be greater than the third reference TTC. The first emergency relative speed may be greater than the second emergency relative speed. The first required deceleration may be greater than the second required deceleration.

According to an embodiment, the at least one instruction may be configured to, when executed by the controller, cause the driving control apparatus to: identify a headway distance between the ego vehicle and at least one other vehicle presenting in front of the ego vehicle based on the driving situation; and control the ego vehicle in the third driving mode, when the headway distance is greater than a predetermined target headway distance.

According to another aspect of the present disclosure, a driving control method may include identifying, by a controller, at least one of a driving situation of an ego vehicle, driving information of the ego vehicle, or any combination thereof, using a sensor device. The driving control method may include performing, by the controller, coasting control of the ego vehicle based on a first driving mode, when the at least one of the driving situation, the driving information, or the any combination thereof meets a specified condition. The driving control method may include identifying, by the controller, risk information including at least one of at least one time to collision (TTC), a timegap with a forward vehicle, a relative speed to the forward vehicle, or any combination thereof. The driving control method may include determining, by the controller, whether to switch a driving mode to a second driving mode or a third driving mode including braking control, based on a result of comparing the risk information with a threshold.

According to an embodiment, performing the coasting control of the ego vehicle based on the first driving mode, when the at least one of the driving situation, the driving information, or the any combination thereof meets the specified condition, by the controller may include identifying, by the controller, that the at least one of the driving situation, the driving information, or the any combination thereof meets the specified condition, when identifying at least one situation of identifying a cut-in situation in which a first other vehicle enters in front of the ego vehicle, an override activation situation of the ego vehicle, a situation in which an operation of a driving control apparatus is activated or resumed in a situation where there is a second other vehicle within a specified distance in front of the ego vehicle, a situation in which a setting value of a target headway distance increases, or any combination thereof.

According to an embodiment, the at least one TTC may include a first TTC identified based on a relative distance between the ego vehicle and another vehicle presenting in front of the ego vehicle and the relative speed. The at least one TTC may also include a second TTC identified based on the relative distance, the relative speed, and a relative acceleration between the ego vehicle and the other vehicle.

According to an embodiment, determining whether to switch the driving mode to the second driving mode or the third driving mode including the braking control, based on the result of comparing the risk information with the threshold, by the controller may include determining, by the controller, whether to switch the driving mode based on a result of comparing the second TTC with a reference TTC, when the relative speed is greater than or equal to a specified speed.

According to an embodiment, the driving control method may further include performing, by the controller, the braking control for the ego vehicle based on the second driving mode in which first required deceleration is minimum deceleration and acceleration for the braking control, i) when the timegap is smaller than a first reference timegap and the relative speed is smaller than a first reference relative speed, ii) when the at least one TTC is smaller than a first reference TTC, iii) when the timegap is smaller than a second reference timegap greater than the first reference timegap, the at least one TTC is smaller than a second reference TTC greater than the first reference TTC, and the relative speed is smaller than a first emergency relative speed smaller than the first reference relative speed, or iv) when a driving speed of the ego vehicle increases while performing the coasting control.

According to an embodiment, the driving control method may further include, while performing, by the controller, the coasting control or performing, by the controller, the braking control based on the second driving mode, performing, by the controller, the braking control for the ego vehicle based on the third driving mode in which second required deceleration is minimum deceleration and acceleration for the braking control, i) when the timegap is smaller than a third reference timegap and the relative speed is smaller than a second reference relative speed, ii) when the at least one TTC is smaller than a third reference TTC, or iii) when the relative speed is smaller than a second emergency relative speed.

According to an embodiment, the driving control method may further include identifying, by the controller, a headway distance between the ego vehicle and at least one other vehicle presenting in front of the ego vehicle based on the driving situation. The driving control method may further include controlling, by the controller, the ego vehicle in the third driving mode, when the headway distance is greater than a predetermined target headway distance.

According to another aspect of the present disclosure, a computer-readable medium may include a program for executing a driving control method including identifying, by a controller, at least one of a driving situation of an ego vehicle, driving information of the ego vehicle, or any combination thereof, using a sensor device. The driving control method may also include performing, by the controller, coasting control of the ego vehicle based on a first driving mode, when the at least one of the driving situation, the driving information, or the any combination thereof meets a specified condition. The driving control method may also include identifying, by the controller, risk information including at least one of at least one time to collision (TTC), a timegap with a forward vehicle, a relative speed to the forward vehicle, or any combination thereof. The driving control method may also include determining, by the controller, whether to switch a driving mode to a second driving mode or a third driving mode including braking control, based on a result of comparing the risk information with a threshold.

According to an embodiment, performing the coasting control of the ego vehicle based on the first driving mode, when the at least one of the driving situation, the driving information, or the any combination thereof meets the specified condition, by the controller may include identifying, by the controller, that the at least one of the driving situation, the driving information, or the any combination thereof meets the specified condition, when identifying at least one situation of a cut-in situation in which a first other vehicle enters in front of the ego vehicle, an override activation situation of the ego vehicle, a situation in which an operation of a driving control apparatus is activated or resumed in a situation where there is a second other vehicle within a specified distance in front of the ego vehicle, a situation in which a setting value of a target headway distance increases, or any combination thereof.

According to an embodiment, the at least one TTC may include a first TTC identified based on a relative distance between the ego vehicle and another vehicle presenting in front of the ego vehicle and the relative speed. The at least one TTC may also include a second TTC identified based on the relative distance, the relative speed, and a relative acceleration between the ego vehicle and the other vehicle.

According to an embodiment, determining whether to switch the driving mode to the second driving mode or the third driving mode including the braking control, based on the result of comparing the risk information with the threshold, by the controller may include determining, by the controller, whether to switch the driving mode based on a result of comparing the second TTC with a reference TTC, when the relative speed is greater than or equal to a specified speed.

According to an embodiment, the driving control method further include performing, by the controller, the braking control for the ego vehicle based on the second driving mode in which first required deceleration is minimum deceleration and acceleration for the braking control, i) when the timegap is smaller than a first reference timegap and the relative speed is smaller than a first reference relative speed, ii) when the at least one TTC is smaller than a first reference TTC, iii) when the timegap is smaller than a second reference timegap greater than the first reference timegap, the at least one TTC is smaller than a second reference TTC greater than the first reference TTC, and the relative speed is smaller than a first emergency relative speed smaller than the first reference relative speed, or iv) when a driving speed of the ego vehicle increases while performing the coasting control.

BRIEF DESCRIPTION OF THE DRAWINGS

The above and other objects, features, and advantages of the present disclosure should be more apparent from the following detailed description taken in conjunction with the accompanying drawings.

Figure 1:
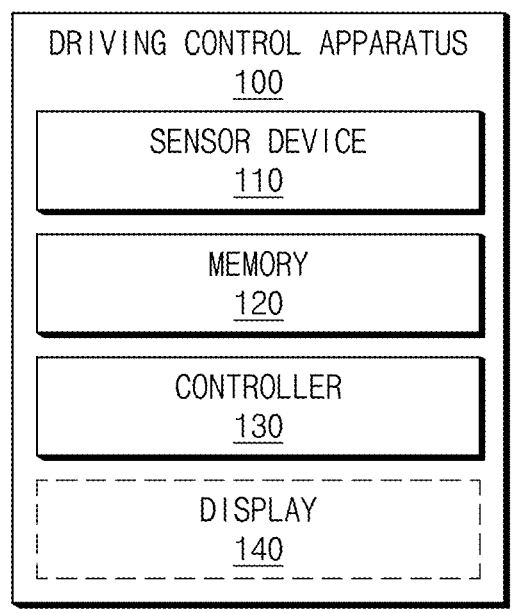
FIG. 1 is a block diagram illustrating components of a driving control apparatus according to an embodiment of the present disclosure.

With regard to description of drawings, the same or similar denotations may be used for the same or similar components.

DETAILED DESCRIPTION

Hereinafter, some embodiments of the present disclosure are described in detail with reference to the drawings. In the drawings, the same reference numerals are used throughout to designate the same or equivalent components. In addition, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are only used to distinguish one element from another element but do not limit the corresponding elements irrespective of the order or priority of the corresponding elements. Furthermore, unless otherwise defined, all terms including technical and scientific terms used herein should be interpreted as is customary in the art to which the present disclosure belongs. It should be understood that terms used herein should be interpreted as having a meaning that is consistent with their meaning in the context of this disclosure and the relevant art. The terms should not be interpreted in an idealized or overly formal sense unless expressly so defined herein. When a component, device, element, or the like of the present disclosure is described as having a purpose or performing an operation, function, or the like, the component, device, element, or the like should be considered herein as being "configured to" meet that purpose or to perform that operation or function. Each of the component, device, element, and the like may separately embody or be included with a processor and a memory, such as a non-transitory computer readable media, as part of the apparatus.

Hereinafter, embodiments of the present disclosure are described in detail with reference to FIGS. 1-7.

FIG. 1 is a block diagram illustrating components of a driving control apparatus according to an embodiment of the present disclosure.

According to an embodiment, a driving control apparatus 100 may include at least one of a sensor device 110, a memory 120, a controller 130, a display 140, or any combination thereof. The components of the driving control apparatus 100, which are shown in FIG. 1, are illustrative, and embodiments of the present disclosure are not limited thereto. For example, the driving control apparatus 100 may further include components (e.g., at least one of an interface, a communication device, a notification device, or any combination thereof) which are not shown in FIG. 1.

According to an embodiment, the sensor device 110 may obtain (or sense) various pieces of information used for driving of an ego vehicle.

For example, the sensor device 110 may include at least one sensor including at least one of a camera, radio detection and ranging (RADAR), light detection and ranging (Li-DAR), or any combination thereof. The components included in the sensor device 110 may obtain various pieces of information in front of, at a side of, and/or behind the ego vehicle.

For example, the sensor device 110 may identify at least one of a driving situation of the ego vehicle, driving information of the ego vehicle, or any combination thereof.

As an example, the sensor device 110 may identify information about a driving situation of the ego vehicle. The information about the driving situation of the ego vehicle includes information about at least one other vehicle, which is present in front of the ego vehicle. The sensor device 110 may identify at least one of, for example, a headway distance between the ego vehicle and the at least one other vehicle, a relative speed between the ego vehicle and the at least one other vehicle, relative acceleration between the ego vehicle and the at least one other vehicle, or any combination thereof.

As an example, the sensor device 110 may identify driving information of the ego vehicle. The driving information of the ego vehicle includes information about at least one of a driving speed of the ego vehicle, driving acceleration of the ego vehicle, a driving mode of the ego vehicle, a driving distance of the ego vehicle, or any combination thereof.

At least some of the above-mentioned operations performed by the sensor device 110 may be understood as being performed by the controller 130 using information obtained by the sensor device 110.

According to an embodiment, the memory 120 may store a command or data. For example, the memory 120 may store one or more instructions, when executed by the controller 130, causing the driving control apparatus 100 to perform various operations.

For example, the memory 120 and the controller 130 may be implemented as one chipset. The controller 130 may include at least one of a communication processor or a modem.

For example, the memory 120 may store various pieces of information associated with the driving control apparatus 100. As an example, the memory 120 may store information about an operation history of the controller 130. As an example, the memory 120 may store information associated with states and/or operations of components (e.g., at least one of an engine control unit (ECU), the sensor device 110, the controller 130, the display 140, or any combination thereof) of the ego vehicle.

According to an embodiment, the controller 130 may be operatively connected with the sensor 110, the memory 120, and/or the display 140. For example, the controller 130 may control operations of the sensor 110, the memory 120, and/or the display 140. At least some of embodiments described as being performed by the sensor 110, the memory 120, and/or the display 140 in the description of FIG. 1 may be performed based on control of the controller 130.

For example, the controller 130 may identify at least one of a driving situation of the ego vehicle, driving information of the ego vehicle, or any combination thereof, using the sensor device 110.

As an example, the driving situation may include at least one of a headway distance between the ego vehicle and the at least one other vehicle, a relative speed between the ego vehicle and the at least one other vehicle, relative acceleration between the ego vehicle and the at least one other vehicle, or any combination thereof.

As an example, the driving information may include information about at least one of a driving speed of the ego vehicle, driving acceleration of the ego vehicle, a driving mode of the ego vehicle, a driving distance of the ego vehicle, or any combination thereof.

For example, when the at least one of the driving situation, the driving information, or the any combination thereof meets a specified condition, the controller 130 may perform coasting control of the ego vehicle based on a first driving mode.

As an example, when identifying a cut-in situation in which a first other vehicle enters in front of the ego vehicle, the controller 130 may identify that the specified condition is met.

As an example, when identifying an override activation situation of the ego vehicle, the controller 130 may identify that the specified condition is met. Override may include, for example, a situation in which the driving control apparatus 100 first processes a control command for a braking device (e.g., a brake) and compulsorily performs braking (or deceleration) control for the ego vehicle when it should deliver a control command (e.g., a braking command and a driving command) to the braking device and a driving device (e.g., a motor) at substantially the same time.

As an example, when identifying that an operation of the driving control apparatus 100 is activated or resumed in a situation where there is a second other vehicle within a specified distance in front of the ego vehicle, the controller 130 may identify that the specified condition is met. The present embodiment may perform, for example, priority braking control to prevent a collision with the second other vehicle, when the driving control apparatus 100 is powered on in the situation where there is the second other vehicle within the specified distance.

As an example, when identifying that a setting value about a target headway distance increases, the controller 130 may identify that the specified condition is met. For example, the target headway distance may be increased based on a user input to the ego vehicle (e.g., a touch input to a button provided in the steering wheel). In this situation, when identifying that another vehicle spaced apart from the ego vehicle beyond the target headway distance before the target headway distance is changed is now present within the increased target headway distance, because the specified condition is met, the controller 130 may release the coasting control and may perform braking control according to a second driving mode or a third driving mode.

As an example, coasting may include a driving situation where the controller 130 continues inertial driving without delivering a control command for the driving device or the braking device. The first driving mode may include, for example, a driving mode in which the controller 130 controls driving of the ego vehicle without outputting a braking command.

For example, the controller 130 may identify risk information including at least one of at least one time to collision (TTC), a timegap with a forward vehicle, a relative speed to the forward vehicle, or any combination thereof.

As an example, the at least one TTC may be identified based on a mapping table stored in the memory 120. The mapping table may include a TTC value corresponding to a relative speed between the ego vehicle and the forward vehicle in front of the ego vehicle. As another example, the at least one TTC may be identified based on Equations 1 and 2 below.

As an example, the timegap with the forward vehicle may be a time when the ego vehicle will be expected to collide with the forward vehicle (or come into contact with the forward vehicle) based on a driving speed of the ego vehicle and a driving speed of the forward vehicle.

As an example, the at least one TTC may include a first TTC ($TTC_1$) and/or a second TTC ($TTC_2$), which are identified based on Equations 1 and 2 below.

$$TTC_1 = \frac{d_{rel}}{v_{rel}} \quad \text{[Equation 1]}$$

$$TTC_2 = \frac{-v_{rel} - \sqrt{v_{rel}^2 - 2a_{rel}d_{rel}}}{a_{rel}} \quad \text{[Equation 2]}$$

For example, according to Equation 1 above, the at least one TTC may include the first TTC ($TTC_1$) identified based on a headway distance $d_{rel}$ (or a relative distance) and a relative speed $v_{rel}$ between the ego vehicle and another vehicle in front of the ego vehicle.

For example, according to Equation 2 above, the at least one TTC may include the second TTC ($TTC_2$) identified based on the headway distance $d_{rel}$ (or the relative distance) and the relative speed $v_{rel}$ between the ego vehicle and the other vehicle in front of the ego vehicle and relative acceleration $a_{rel}$ between the ego vehicle and the other vehicle.

As an example, when the relative speed included in the risk information is greater than or equal to a specified speed, the controller 130 may select the second TTC ($TTC_2$) between the first TTC ($TTC_1$) and the second TTC ($TTC_2$) as a parameter for determining whether to activate braking control.

As an example, the timegap with the forward vehicle may be identified based on Equation 3 below.

$$TimeGap = \frac{d_{rel}}{v_{ego}} \quad \text{[Equation 3]}$$

For example, according to Equation 3 above, the timegap may be identified based on the headway distance $d_{rel}$ between the ego vehicle and the other vehicle in front of the ego vehicle and a real-time driving speed $v_{ego}$ of the ego vehicle.

As an example, the relative speed $v_{rel}$ may be identified based on Equation 4 below.

$$\text{Relative Speed} = v_{front} - v_{ego} \quad \text{[Equation 4]}$$

For example, according to Equation 4 above, the relative speed $v_{rel}$ may be identified based on the real-time driving speed $v_{ego}$ of the ego vehicle and a real-time driving speed $v_{front}$ of the other vehicle in front of the ego vehicle.

For example, the controller 130 may determine whether to switch a driving mode to the second driving mode or the third driving mode including the braking control, based on the result of comparing the risk information with the threshold.

The second driving mode may be, for example, a driving mode including braking control, in which minimum deceleration and acceleration (or a lower limit of deceleration and acceleration) for braking control is set to first required deceleration (e.g., $-2$ m/s$^2$).

The third driving mode may be, for example, a driving mode including braking control, in which minimum deceleration and acceleration (or a lower limit of deceleration and acceleration) for braking control is set to second required deceleration (e.g., $-3.5$ m/s$^2$). The second required deceleration may be smaller than the first required deceleration. In other words, the third driving mode may be a driving mode, which may output a larger magnitude of deceleration and acceleration for braking control of the ego vehicle than the second driving mode.

As an example, when the timegap included in the risk information is smaller than a first reference timegap (e.g., 1.3 seconds) and when the relative speed is smaller than a first reference relative speed (e.g., 1 m/s$^2$), the controller 130 may release the coasting control and may perform driving control (or braking control) for the ego vehicle based on the second driving mode.

As an example, when the TTC selected based on the above-mentioned criterion when the at least one TTC is smaller than a first reference TTC, the controller 130 may release the coasting control and may perform driving control for the ego vehicle based on the second driving mode.

As an example, when the timegap is smaller than a second reference timegap, when the at least one TTC is smaller than a second reference TTC, and when the relative speed is smaller than a first emergency relative speed (e.g., $-2.5$ m/s$^2$), the controller 130 may release the coasting control and may perform driving control for the ego vehicle based on the second driving mode. The second reference timegap and the second reference TTC may be, for example, values respectively greater than the first reference timegap and the first reference TTC, respectively. The first emergency relative speed may be, for example, a value smaller than the first reference relative speed.

For example, when the following situation is identified, while performing the coasting control based on the first driving mode or performing driving control based on the second driving mode, the controller 130 may perform driving control (or braking control) for the ego vehicle based on the third driving mode.

As an example, when the timegap included in the risk information is smaller than a third reference timegap (e.g., 0.4 seconds) and when the relative speed is smaller than a second reference relative speed (e.g., 0 m/s$^2$), the controller 130 may perform driving control for the ego vehicle based on the third driving mode. The third reference timegap and the second reference relative speed may be, for example, values respectively smaller than the first reference timegap and the first reference relative speed, respectively.

As an example, when the at least one TTC is smaller than a third reference TTC, the controller 130 may perform driving control for the ego vehicle based on the third driving mode. The third reference TTC may be, for example, a value smaller than the first reference TTC.

As an example, when the relative speed is smaller than a second emergency relative speed (e.g., −7 m/s$^2$), the controller 130 may perform driving control for the ego vehicle based on the third driving mode. The second emergency relative speed may be, for example, a value smaller than the first emergency relative speed.

For example, the controller 130 may determine whether to activate a driving mode including braking control based on the result of comparing the headway distance between the host vehicle and the forward vehicle and the target headway distance.

As an example, the controller 130 may identify the headway distance between the host vehicle and the forward vehicle and may control driving of the ego vehicle in the third driving mode when the identified headway distance is greater than a predetermined target headway distance. In other words, when the identified headway distance is greater than the target headway distance, the controller 130 may determine that the current situation is a general situation, which does not requires a deceleration limit function, and may end the coasting control to release a deceleration limit according to the first driving mode.

According to embodiment embodiments, the display 140 may include at least one display device (e.g., a display).

For example, the display 140 may provide a user with information about at least one of a driving mode of the ego vehicle, a driving state of the ego vehicle, driving information of the ego vehicle, or any combination thereof.

The components of the driving control apparatus 100, which are shown in FIG. 1, are illustrative, and embodiments of the present disclosure are not limited thereto. For example, the driving control apparatus 100 may further include a notification device (not shown).

According to an embodiment, the notification device may include at least one output device. For example, the notification device may include an output device (e.g., a speaker) included in at least a part of the ego vehicle.

For example, the notification device may output various types of sounds to the outside. For example, the notification device may output information about at least one of a driving mode of the ego vehicle, a driving state of the ego vehicle, driving information of the ego vehicle, or any combination thereof.

Figure 2:
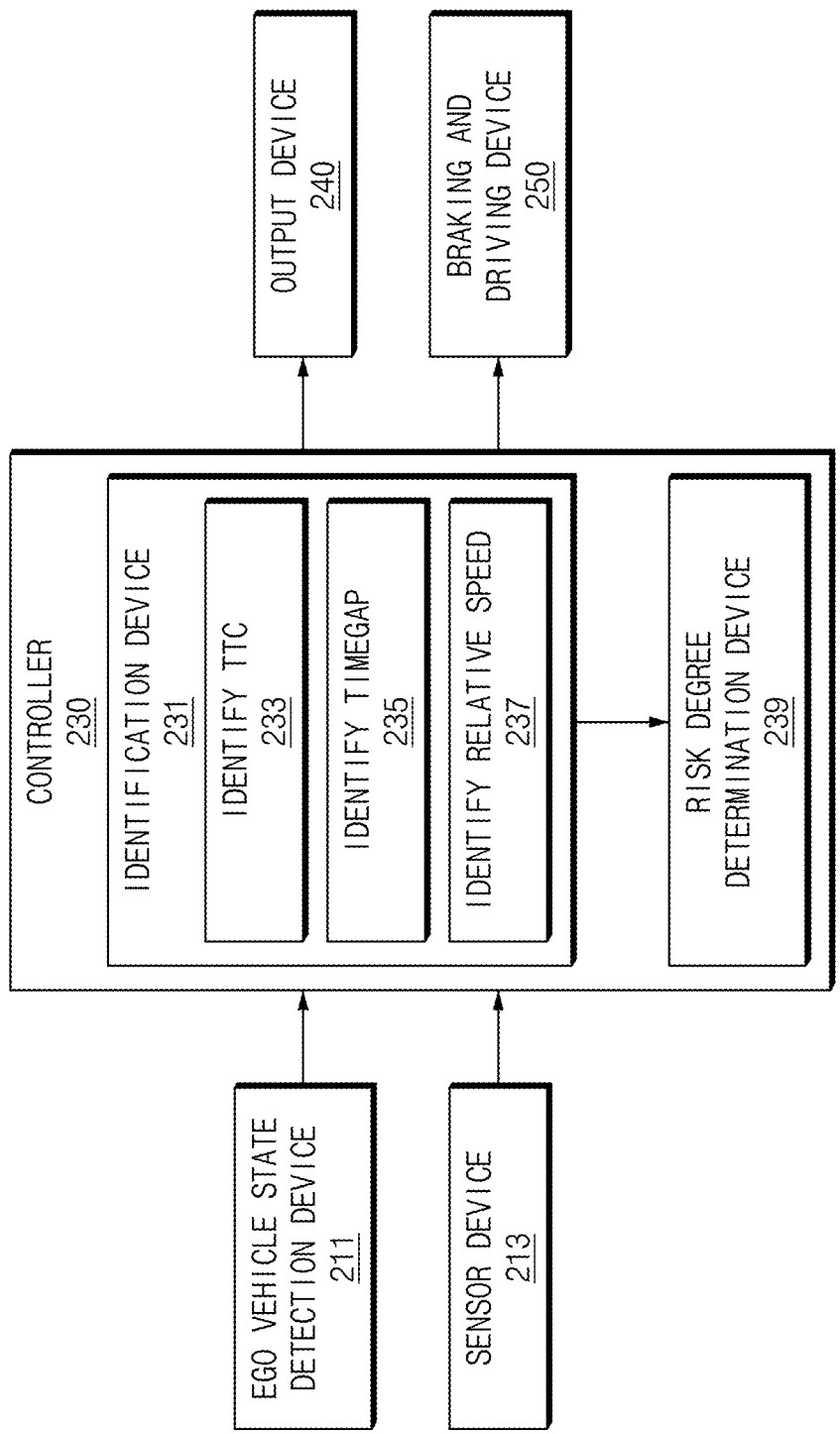
FIG. 2 is a block diagram illustrating components of a driving control apparatus according to an embodiment of the present disclosure.

FIG. 2 is a block diagram illustrating components of a driving control apparatus according to an embodiment of the present disclosure.

According to an embodiment, a driving control apparatus (e.g., a driving control apparatus 100 of FIG. 1) may include components shown in FIG. 2. For example, the driving control apparatus may include an ego vehicle state detection device 211, a sensor device 213 (e.g., a sensor device 110 of FIG. 1), a controller 230 (e.g., a controller 130 of FIG. 1), an output device 240 (e.g., a display 140 of FIG. 1), and/or a braking and driving device 250. For example, the controller 230 may include an identification device 231 and a risk degree determination device 239.

For example, the driving control apparatus may identify driving information (e.g., at least one of a driving speed, a driving mode, driving acceleration, a driving distance, or any combination thereof) of an ego vehicle using the ego vehicle state detection device 211. The ego vehicle state detection device 211 and the sensor device 213 are shown as separate components independent of each other in FIG. 2, but this is illustrative. The ego vehicle state detection device 211 may be implemented as one component of the sensor device 213.

For example, the driving control apparatus may identify a driving situation (e.g., at least one of whether there is another vehicle, a headway distance from the other vehicle, a driving speed of the other vehicle, driving acceleration of the other vehicle, or any combination thereof) of the ego vehicle using the sensor device 213.

For example, the driving control apparatus may identify a driving mode for driving control for the ego vehicle using the controller 230, may generate a control command based on the identified driving mode, and may deliver the generated control command to the braking and driving device 250. Thus, the driving control apparatus may perform driving control (or deceleration control) for the ego vehicle. The controller 230 may identify a driving mode based on at least some of the pieces of information identified by the ego vehicle state detection device 211 and the sensor device 213.

As an example, referring to reference numeral 233, the controller 230 may identify at least one TTC using the identification device 231. The at least one TTC may include a first TTC and a second TTC.

As an example, referring to reference numeral 235, the controller 230 may identify a timegap using the identification device 231.

As an example, referring to reference numeral 237, the controller 230 may identify a relative speed using the identification device 231.

For example, the controller 230 may deliver at least some of the pieces of information identified using the identification device 231 to the risk degree determination device 239.

For example, the controller 230 may identify a risk degree using the risk degree determination device 239 and may identify one driving mode according to the risk degree among a first driving mode, a second driving mode, and a third driving mode. A description of the division of the driving mode may be replaced with the above-mentioned description of FIG. 1.

For example, the controller 230 may deliver a control command generated based on the identified driving mode to the braking and driving device 250.

For example, the controller 230 may deliver at least some of pieces of information identified (or output) by means of at least one of the ego vehicle state detection device 211, the sensor device 213, the identification device 231, the risk degree determination device 239, or any combination thereof to the output device 240.

For example, the output device 240 may visually and/or audibly provide a user with at least some of the pieces of information delivered from the controller 230.

For example, the braking and driving device 250 may perform an operation about braking and/or driving of the ego vehicle based on the control command delivered from the controller 230.

Figure 3:
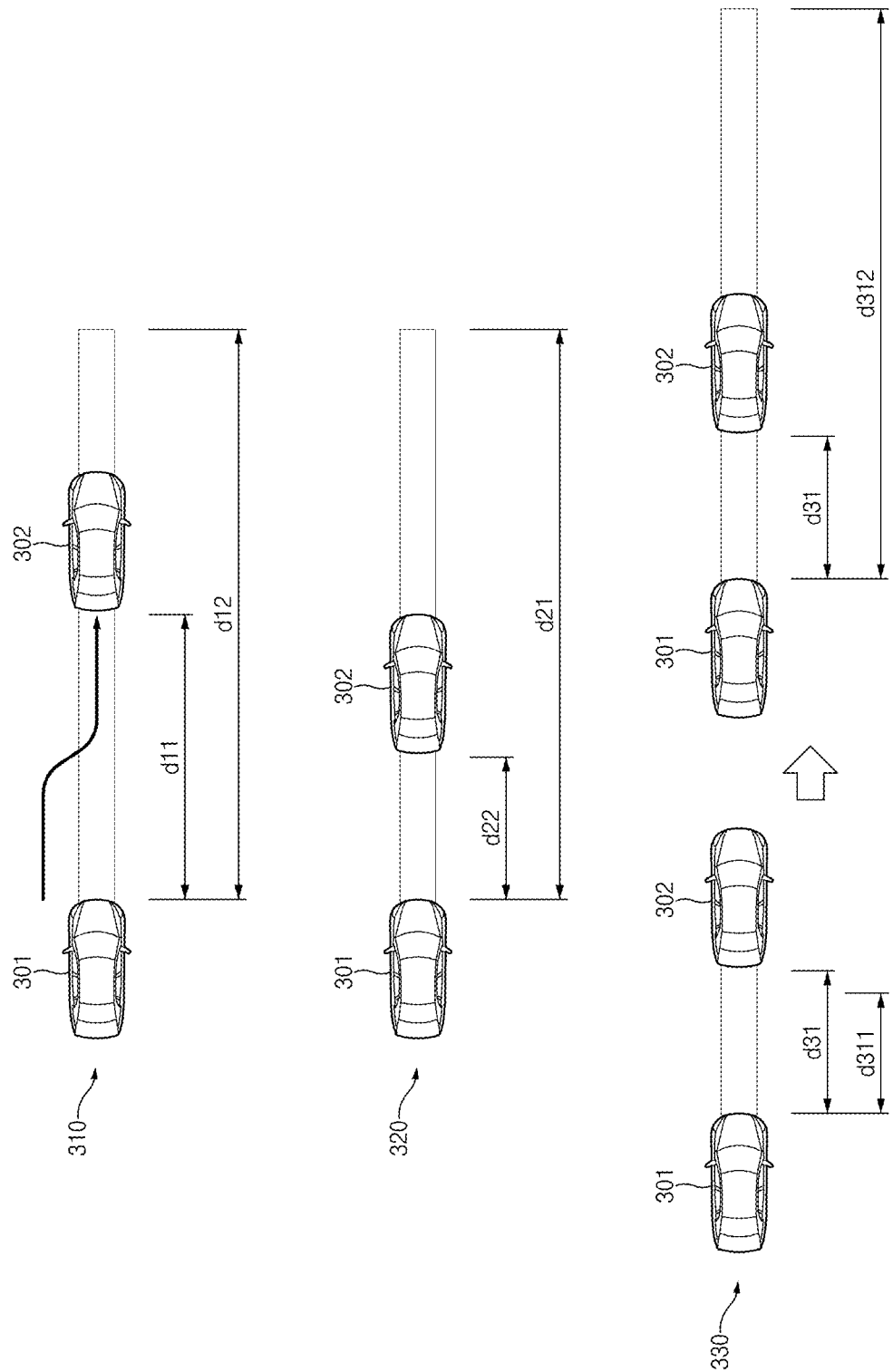
FIG. 3 is an operational conceptual diagram of a driving control apparatus considering a driving situation between an ego vehicle and another vehicle, in a driving control apparatus according to an embodiment of the present disclosure.

FIG. 3 is an operational conceptual diagram of a driving control apparatus considering a driving situation between an ego vehicle and another vehicle according to an embodiment of the present disclosure.

According to an embodiment, when at least one of a driving situation, driving information, or any combination thereof meets a specified condition, a driving control apparatus (e.g., a driving control apparatus 100 of FIG. 1) may perform coasting control of an ego vehicle 301 based on a first driving mode.

Referring to reference numeral 310, according to an embodiment, when identifying a cut-in situation in which another vehicle 302 enters in front of the ego vehicle 301, the driving control apparatus may identify a specified condition is met. For example, when a first headway distance d11 from the ego vehicle 301 is smaller than a target headway distance d12 after the other vehicle 302 completes the cut-in operation, the driving control apparatus may identify that the specified condition is met.

Referring to reference numeral 320, according to an embodiment, when identifying an override activation situation of the ego vehicle 301 or when identifying the operation of the driving control apparatus is activated or resumed in a situation where there is the other vehicle 302 within a specified distance d21 (or the target headway distance) in front of the ego vehicle 301, the driving control apparatus may identify that the specified condition is met. When the driving control apparatus is powered on in a situation where a second headway distance d22 between the host vehicle 301 and the other vehicle 302 is smaller than the specified distance d21, the present embodiment may perform priority braking control to prevent a collision with a second other vehicle.

Referring to reference numeral 330, according to an embodiment, when identifying that a setting value about the target headway distance increases, the driving control apparatus may identify that the specified condition is met. For example, the target headway distance may be increased from a first distance d311 to a second distance d312 based on a user input to the ego vehicle 301. In this situation, when identifying that the other vehicle 302 spaced apart from the host vehicle 301 by a third headway distance d31, which is greater than the first distance d311 before the target headway distance is changed, is present within the second distance d312 after the target headway distance is changed, because the specified condition is met, the driving control apparatus may release the coasting driving control and may perform braking control according to a second driving mode or a third driving mode.

Although not illustrated, according to an embodiment, when identifying an override activation situation of the ego vehicle 301, the driving control apparatus may identify that the specified condition is met.

Figure 4:
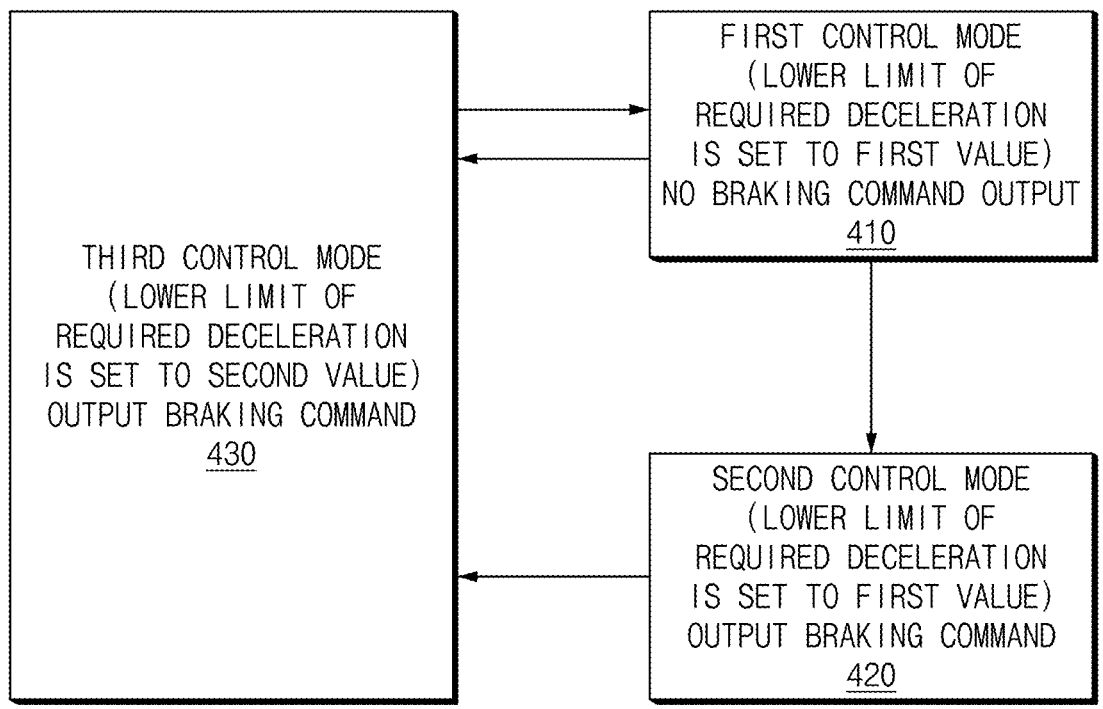
FIG. 4 is an operational conceptual diagram of a driving control apparatus according to an embodiment of the present disclosure.

FIG. 4 is an operational conceptual diagram of a driving control apparatus according to an embodiment of the present disclosure.

According to an embodiment, the driving control apparatus may perform driving control for an ego vehicle based on any one of a plurality of driving modes (e.g., a first control (or driving) mode, a second control mode, and a third control mode).

Referring to reference numeral 410, for example, the first control mode may be a driving mode in which a lower limit of required deceleration (or minimum deceleration and acceleration for braking control) is set to a first value (e.g., $-2 \text{ m/s}^2$). The first control mode may be a driving mode for controlling the ego vehicle to perform coasting without outputting a braking command.

Referring to reference numeral 420, for example, the second control mode may be a driving mode in which a lower limit of required deceleration (or minimum deceleration and acceleration for braking control) is set to the first value. The second control mode may be a driving mode for generating a braking command with regard to a driving situation, driving information, or the like of the ego vehicle and performing braking control.

Referring to reference numeral 430, for example, the third control mode may be a driving mode in which a lower limit of required deceleration (or minimum deceleration and acceleration for braking control) is set to a second value (e.g., $-3.5 \text{ m/s}^2$) smaller than the first value. The third control mode may be a driving mode for generating a braking command with higher deceleration and acceleration than the second control mode with regard to a driving situation, driving information, or the like of the ego vehicle and performing braking control.

Figure 5:
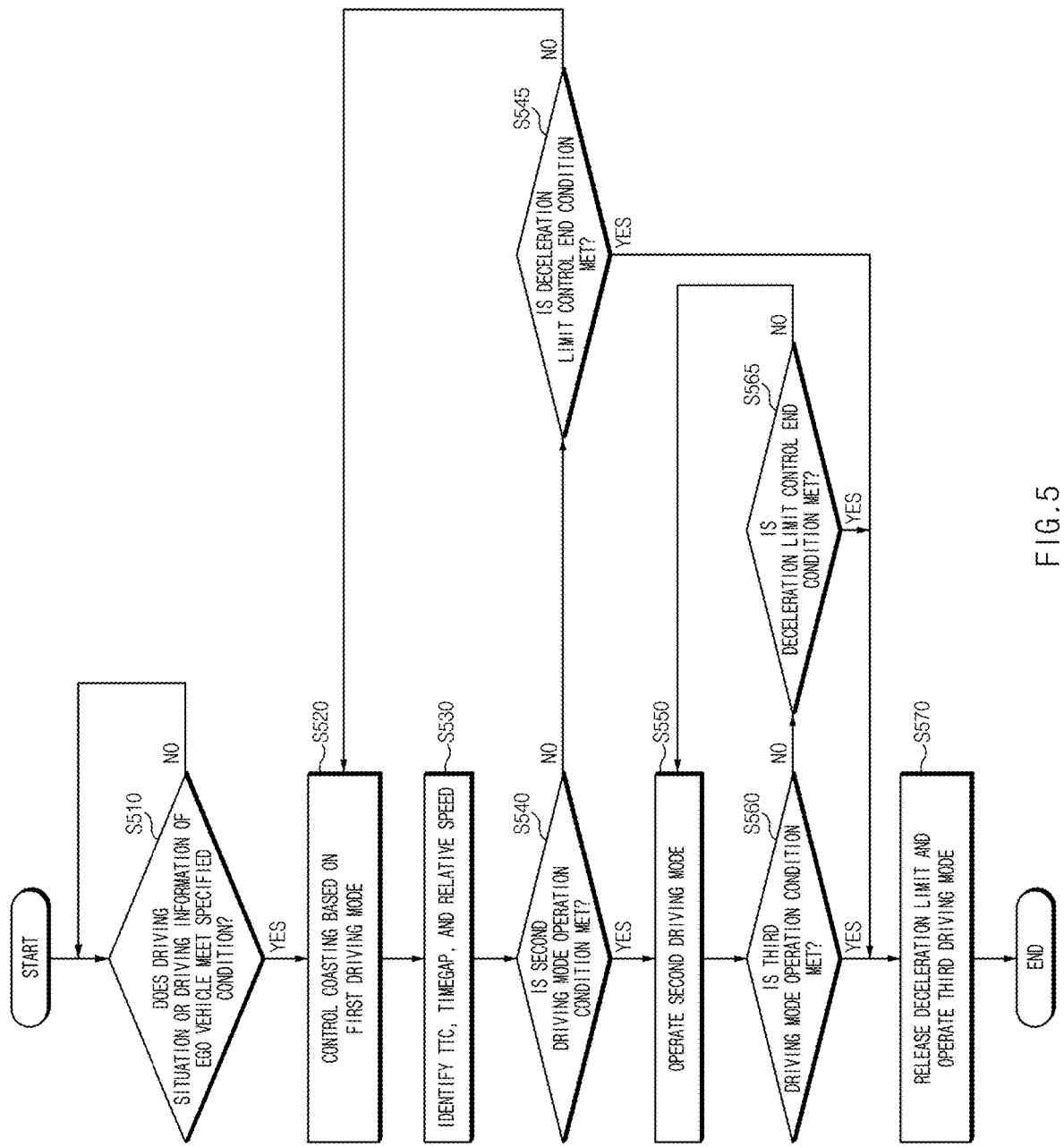
FIG. 5 is a flowchart of a driving control method according to an embodiment of the present disclosure.

FIG. 5 is a flowchart of a driving control method according to an embodiment of the present disclosure.

According to an embodiment, a driving control apparatus (e.g., a driving control apparatus 100 of FIG. 1) may perform operations disclosed in FIG. 5. For example, at least some of components (e.g., a sensor device 110, a memory 120, and/or a controller 130 of FIG. 1) included in the driving control apparatus may be configured to perform the operations of FIG. 5.

Operations in S510 to S570 in an embodiment below may be sequentially performed but are not necessarily sequentially performed. For example, an order of the respective operations may be changed, and at least two operations may be performed in parallel. Furthermore, contents, which correspond to or are duplicated with the contents described above in conjunction with FIG. 5, may be briefly described or omitted.

According to an embodiment, in S510, the driving control apparatus may identify whether a driving situation or driving information of an ego vehicle meet a specified condition, using a sensor device.

For example, when it is identified that the driving situation or the driving information meets the specified condition (e.g., S510—YES), the driving control apparatus may perform S520.

For example, when it is identified that the driving situation or the driving information does not meet the specified condition (e.g., S510—NO), the driving control apparatus may repeatedly perform S510.

According to an embodiment, in S520, the driving control apparatus may perform coasting control based on a first driving mode.

According to an embodiment, in S530, the driving control apparatus may identify a TTC, a timegap, and a relative speed.

According to an embodiment, in S540, the driving control apparatus may determine whether the identified TTC, the identified timegap, and/or the identified relative speed meet(s) a second driving mode operation condition.

For example, when the second driving mode operation condition is met (e.g., S540—YES), the driving control apparatus may perform S550.

For example, when it is identified that the second driving mode operation condition is not met (e.g., S540—NO), the driving control apparatus may perform S545.

According to an embodiment, in S545, the driving control apparatus may identify whether a deceleration limit control end condition is met.

For example, the deceleration limit control end condition may include at least one condition to end deceleration limit control based on the first driving mode.

For example, the deceleration limit control end condition may include a case in which a headway distance is greater than a predetermined target headway distance. The driving control apparatus may identify, for example, a headway distance between the ego vehicle and at least one other vehicle, which is present in front of the ego vehicle, based on the driving situation identified using the sensor device. The driving control apparatus may also compare the headway distance with the predetermined target headway distance. For example, when the identified headway distance is greater than the predetermined target headway distance, the driving control apparatus may identify that the deceleration limit control end condition is met.

For example, when the deceleration limit control end condition is met (e.g., S545—YES), the driving control apparatus may perform S570.

For example, when it is identified that the deceleration limit control end condition is not met (e.g., S545—NO), the driving control apparatus may perform S520.

According to an embodiment, in S550, the driving control apparatus may operate a second driving mode.

For example, the driving control apparatus may end the driving control for the ego vehicle based on the first driving mode and may perform driving control (e.g., driving control including braking control) for the ego vehicle based on the second driving mode.

According to an embodiment, in S560, the driving control apparatus may determine whether the identified TTC, the identified timegap, and/or the identified relative speed meet(s) a third driving mode operation condition.

For example, when the third driving mode operation condition is met (e.g., S560—YES), the driving control apparatus may perform S570.

For example, when it is identified that the third driving mode operation condition is not met (e.g., S560—NO), the driving control apparatus may perform S565.

According to an embodiment, in S565, the driving control apparatus may identify whether the deceleration limit control end condition is met.

For example, a description of the deceleration limit control end condition may be replaced with the above-mentioned description of S545.

For example, when the deceleration limit control end condition is met (e.g., S565—YES), the driving control apparatus may perform S570.

For example, when it is identified that the deceleration limit control end condition is not met (e.g., S565—NO), the driving control apparatus may perform S550.

According to an embodiment, in S570, the driving control apparatus may release the deceleration limit and may perform driving control for the ego vehicle based on the third driving mode.

For example, the driving control apparatus may release the deceleration limit performed while controlling the ego vehicle based on the first driving mode and/or the second driving mode (e.g., set a lower limit of required deceleration and acceleration to be greater than a lower limit of the third driving mode or output or not output only at least a portion of a braking command) and may perform driving control of the ego vehicle by means of required deceleration greater than a specified lower limit (e.g., $-3.5$ m/s$^2$) based on the third driving mode.

Figure 6:
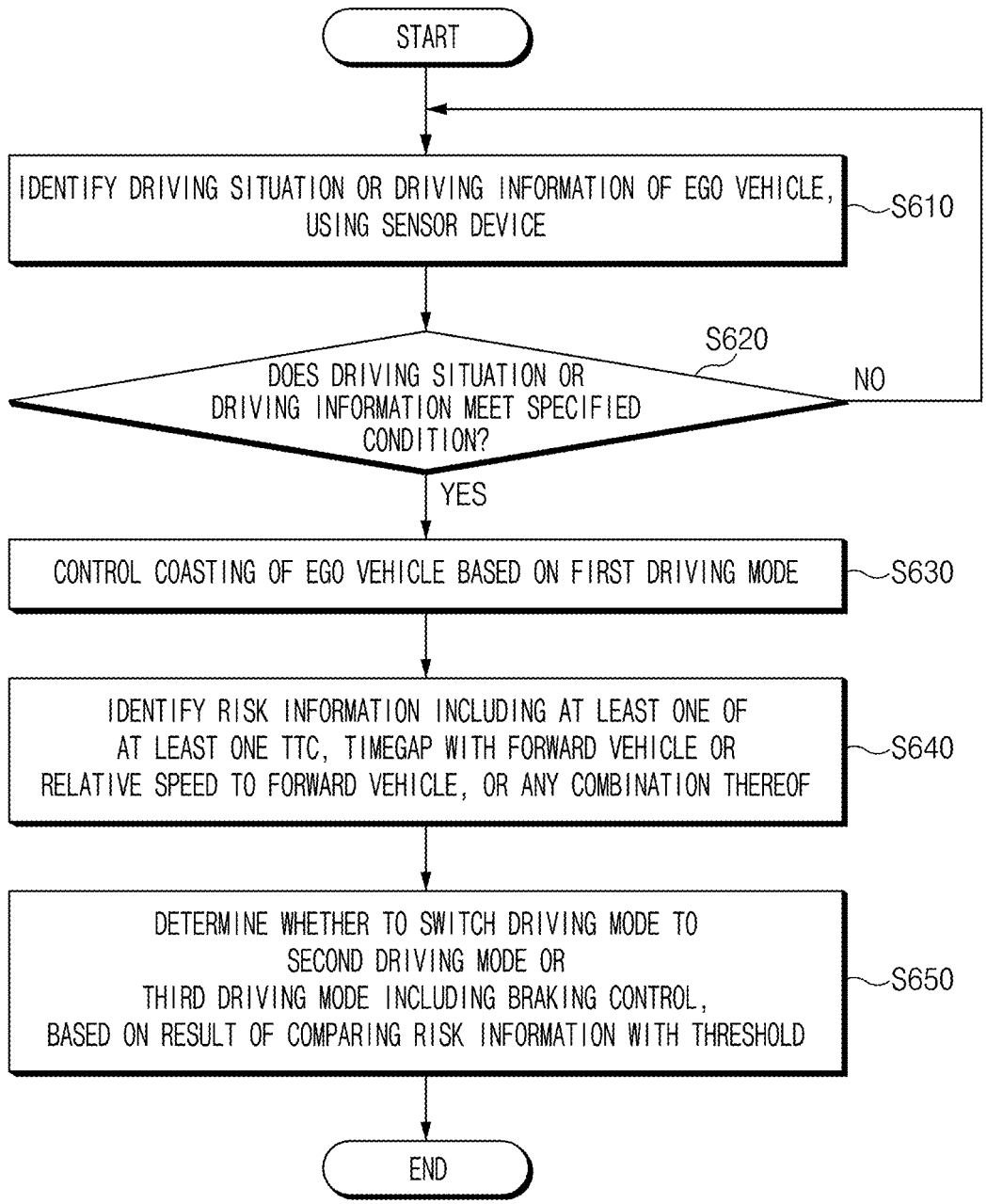
FIG. 6 is a flowchart of a driving control method according to an embodiment of the present disclosure.

FIG. 6 is a flowchart of a driving control method according to an embodiment of the present disclosure.

According to an embodiment, a driving control apparatus (e.g., a driving control apparatus 100 of FIG. 1) may perform operations disclosed in FIG. 6. For example, at least some of components (e.g., a sensor device 110, a memory 120, and/or a controller 130 of FIG. 1) included in the driving control apparatus may be configured to perform the operations of FIG. 6.

Operations in S610 to S650 in an embodiment below may be sequentially performed but are not necessarily sequentially performed. For example, an order of the respective operations may be changed, and at least two operations may be performed in parallel. Furthermore, contents, which correspond to or are duplicated with the contents described above in conjunction with FIG. 6, may be briefly described or omitted.

According to an embodiment, in S610, the driving control apparatus may identify a driving situation or driving information of an ego vehicle, using a sensor device.

According to an embodiment, in S620, the driving control apparatus may identify whether the driving situation or the driving information meets a specified condition.

For example, when it is identified that the driving situation or the driving information meets the specified condition (e.g., S620—YES), the driving control apparatus may perform S630.

For example, when it is identified that the driving situation or the driving information does not meet the specified condition (e.g., S620—NO), the driving control apparatus may repeatedly perform S610.

According to an embodiment, in S630, the driving control apparatus may perform coasting control based on a first driving mode.

According to an embodiment, in S640, the driving control apparatus may identify risk information including at least one of at least one TTC, a timegap with a forward vehicle, a relative speed to the forward vehicle, or any combination thereof.

According to an embodiment, in S650, the driving control apparatus may determine whether to switch a driving mode to a second driving mode or a third driving mode including braking control, based on the result of comparing the risk information with a threshold.

Figure 7:
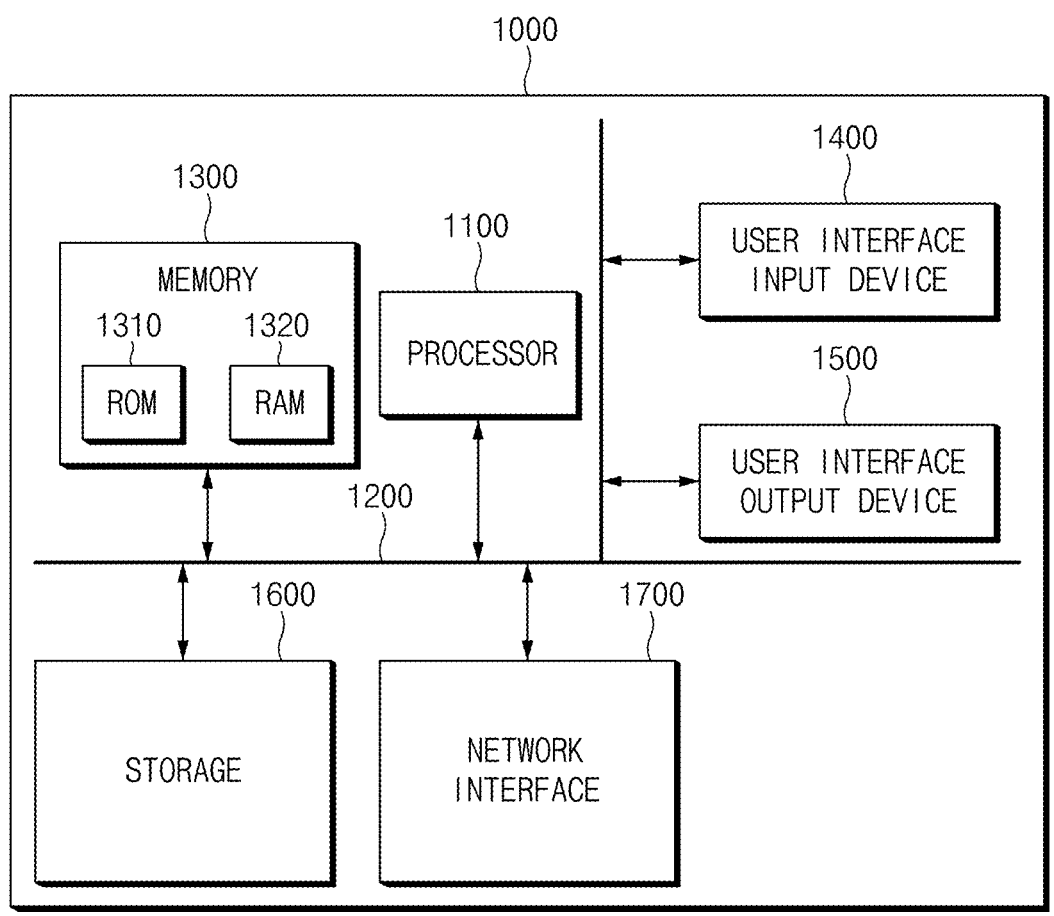
FIG. 7 illustrates a computing system about a driving control method according to an embodiment of the present disclosure.

FIG. 7 illustrates a computing system about a driving control method according to an embodiment of the present disclosure.

Referring to FIG. 7, a computing system 1000 about the driving control method may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description is given of effects of the driving control apparatus and the method thereof according to an embodiment of the present disclosure.

According to at least one of embodiments of the present disclosure, the driving control apparatus may identify a risk level by further using at least one of a TTC, a relative speed, a timegap, or any combination thereof as well as a headway distance and thus may provide a more accurate and practical ego vehicle driving control function (e.g., braking control and/or coasting control).

Furthermore, according to at least one of embodiments of the present disclosure, the driving control apparatus may compare various types of parameters with a threshold and may provide a function for performing driving control for the ego vehicle by selectively using a control mode for driving control as a safety mode (e.g., a first driving mode), a driving mode (e.g., a second driving mode) including first braking control, and a driving mode (e.g., a third driving mode) including a second braking mode stronger than the first braking control based on the compared result.

Furthermore, according to at least one of embodiments of the present disclosure, the driving control apparatus may accurately recognize a driving situation of the ego vehicle and may selectively perform braking control or coasting control based on the recognized result. Thus, braking control may be prevented from being unnecessarily activated or blocking braking control based on the amount of excessive braking. Thus, according to embodiments of the present disclosure, the driving control apparatus may reduce fuel efficiency and improve ride quality.

In addition, various effects ascertained directly or indirectly through the present disclosure may be provided.

Hereinabove, although the present disclosure has been described with reference to embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, embodiments of the present disclosure are not intended to limit the technical spirit of the present disclosure but provided only for the illustrative purpose. The scope of the present disclosure should be construed based on the accompanying claims, and all the technical ideas within the scope equivalent to the claims should be included in the scope of the present disclosure.

What is claimed is:

1. A driving control apparatus, comprising:
a sensor device;
a memory configured to store at least one instruction; and
a controller operatively connected to the sensor device and the memory,
wherein the at least one instruction is configured to, when executed by the controller, cause the driving control apparatus to:
identify at least one of a driving situation of an ego vehicle, driving information of the ego vehicle, or any combination thereof, using the sensor device;
perform coasting control of the ego vehicle based on a first driving mode, when the at least one of the driving situation, the driving information, or the any combination thereof meets a specified condition;
identify risk information including at least one of at least one time to collision (TTC), a timegap with a forward vehicle, a relative speed to the forward vehicle, or any combination thereof; and
determine whether to switch a driving mode to a second driving mode or a third driving mode including braking control, based on a result of comparing the risk information with a threshold,
wherein the specified condition is determined to be met when at least one of the following situation is identified:
a cut-in situation in which a first other vehicle enters in front of the ego vehicle;
an override activation situation of the ego vehicle;
a situation in which an operation of the driving control apparatus is activated or resumed in a situation where there is a second other vehicle within a specified distance in front of the ego vehicle;
a situation in which a setting value of a target headway distance increases; or
any combination thereof.

2. The driving control apparatus of claim 1, wherein the at least one TTC includes:
a first TTC identified based on a relative distance between the ego vehicle and another vehicle presenting in front of the ego vehicle and the relative speed; and
a second TTC identified based on the relative distance, the relative speed, and a relative acceleration between the ego vehicle and the other vehicle.

3. The driving control apparatus of claim 2, wherein the at least one instruction is configured to, when executed by the controller, cause the driving control apparatus to:
determine whether to switch the driving mode based on a result of comparing the second TTC with a reference TTC, when the relative speed is greater than or equal to a specified speed.

4. The driving control apparatus of claim 1, wherein the at least one instruction is configured to, when executed by the controller, cause the driving control apparatus to:
perform the braking control for the ego vehicle based on the second driving mode in which first required deceleration is minimum deceleration and acceleration for the braking control, i) when the timegap is smaller than a first reference timegap and the relative speed is smaller than a first reference relative speed, ii) when the at least one TTC is smaller than a first reference TTC, iii) when the timegap is smaller than a second reference timegap greater than the first reference timegap, the at least one TTC is smaller than a second reference TTC greater than the first reference TTC, and the relative speed is smaller than a first emergency relative speed smaller than the first reference relative speed, or iv) when a driving speed of the ego vehicle increases while performing the coasting control.

5. The driving control apparatus of claim 4, wherein the at least one instruction is configured to, when executed by the controller, cause the driving control apparatus to:
while performing the coasting control or performing the braking control based on the second driving mode, perform the braking control for the ego vehicle based on the third driving mode in which second required deceleration is minimum deceleration and acceleration for the braking control, i) when the timegap is smaller than a third reference timegap and the relative speed is smaller than a second reference relative speed, ii) when the at least one TTC is smaller than a third reference TTC, or iii) when the relative speed is smaller than a second emergency relative speed.

6. The driving control apparatus of claim 5, wherein the first reference timegap is greater than the third reference timegap,
wherein the first reference relative speed is greater than the second reference relative speed,
wherein the first reference TTC is greater than the third reference TTC,
wherein the first emergency relative speed is greater than the second emergency relative speed, and
wherein the first required deceleration is greater than the second required deceleration.

7. The driving control apparatus of claim 1, wherein the at least one instruction is configured to, when executed by the controller, cause the driving control apparatus to:
identify a headway distance between the ego vehicle and at least one other vehicle presenting in front of the ego vehicle based on the driving situation; and
control the ego vehicle in the third driving mode, when the headway distance is greater than a predetermined target headway distance.

8. A driving control method, comprising:
identifying, by a controller, at least one of a driving situation of an ego vehicle, driving information of the ego vehicle, or any combination thereof, using a sensor device;
performing, by the controller, coasting control of the ego vehicle based on a first driving mode, when the at least one of the driving situation, the driving information, or the any combination thereof meets a specified condition;
identifying, by the controller, risk information including at least one of at least one time to collision (TTC), a timegap with a forward vehicle, a relative speed to the forward vehicle, or any combination thereof; and
determining, by the controller, whether to switch a driving mode to a second driving mode or a third driving mode including braking control, based on a result of comparing the risk information with a threshold,
wherein the specified condition is determined to be met when at least one of the following situation is identified:
a cut-in situation in which a first other vehicle enters in front of the ego vehicle;
an override activation situation of the ego vehicle;
a situation in which an operation of a driving control apparatus is activated or resumed in a situation where there is a second other vehicle within a specified distance in front of the ego vehicle;
a situation in which a setting value of a target headway distance increases; or
any combination thereof.

9. The driving control method of claim 8, wherein the at least one TTC includes:
a first TTC identified based on a relative distance between the ego vehicle and another vehicle presenting in front of the ego vehicle and the relative speed; and
a second TTC identified based on the relative distance, the relative speed, and a relative acceleration between the ego vehicle and the other vehicle.

10. The driving control method of claim 9, wherein determining whether to switch the driving mode to the second driving mode or the third driving mode including the braking control, based on the result of comparing the risk information with the threshold, by the controller includes:
determining, by the controller, whether to switch the driving mode based on a result of comparing the second TTC with a reference TTC, when the relative speed is greater than or equal to a specified speed.

11. The driving control method of claim 8, further comprising:
performing, by the controller, the braking control for the ego vehicle based on the second driving mode in which first required deceleration is minimum deceleration and acceleration for the braking control, i) when the timegap is smaller than a first reference timegap and the relative speed is smaller than a first reference relative speed, ii) when the at least one TTC is smaller than a first reference TTC, iii) when the timegap is smaller than a second reference timegap greater than the first reference timegap, the at least one TTC is smaller than a second reference TTC greater than the first reference TTC, and the relative speed is smaller than a first emergency relative speed smaller than the first reference relative speed, or iv) when a driving speed of the ego vehicle increases while performing the coasting control.

12. The driving control method of claim 11, further comprising:
while performing, by the controller, the coasting control or performing, by the controller, the braking control based on the second driving mode,
performing, by the controller, the braking control for the ego vehicle based on the third driving mode in which second required deceleration is minimum deceleration and acceleration for the braking control, i) when the timegap is smaller than a third reference timegap and the relative speed is smaller than a second reference relative speed, ii) when the at least one TTC is smaller than a third reference TTC, or iii) when the relative speed is smaller than a second emergency relative speed.

13. The driving control method of claim 8, further comprising:
identifying, by the controller, a headway distance between the ego vehicle and at least one other vehicle presenting in front of the ego vehicle based on the driving situation; and
controlling, by the controller, the ego vehicle in the third driving mode, when the headway distance is greater than a predetermined target headway distance.

14. A non-transitory computer-readable storage medium including a program for executing a driving control method, the driving control method comprising:
identifying, by a controller, at least one of a driving situation of an ego vehicle, driving information of the ego vehicle, or any combination thereof, using a sensor device;

performing, by the controller, coasting control of the ego vehicle based on a first driving mode, when the at least one of the driving situation, the driving information, or the any combination thereof meets a specified condition;

identifying, by the controller, risk information including at least one of at least one time to collision (TTC), a timegap with a forward vehicle, a relative speed to the forward vehicle, or any combination thereof; and determining, by the controller, whether to switch a driving mode to a second driving mode or a third driving mode including braking control, based on a result of comparing the risk information with a threshold, wherein the specified condition is determined to be met when at least one of the following situation is identified:
- a cut-in situation in which a first other vehicle enters in front of the ego vehicle;
- an override activation situation of the ego vehicle;
- a situation in which an operation of a driving control apparatus is activated or resumed in a situation where there is a second other vehicle within a specified distance in front of the ego vehicle;
- a situation in which a setting value of a target headway distance increases; or
- any combination thereof.

15. The non-transitory computer-readable storage medium of claim 14, wherein the at least one TTC includes:
a first TTC identified based on a relative distance between the ego vehicle and another vehicle presenting in front of the ego vehicle and the relative speed; and
a second TTC identified based on the relative distance, the relative speed, and a relative acceleration between the ego vehicle and the other vehicle.

16. The non-transitory computer-readable storage medium of claim 15, wherein determining whether to switch the driving mode to the second driving mode or the third driving mode including the braking control, based on the result of comparing the risk information with the threshold, by the controller includes:
determining, by the controller, whether to switch the driving mode based on a result of comparing the second TTC with a reference TTC, when the relative speed is greater than or equal to a specified speed.

17. The non-transitory computer-readable storage medium of claim 14, wherein the driving control method further includes:
performing, by the controller, the braking control for the ego vehicle based on the second driving mode in which first required deceleration is minimum deceleration and acceleration for the braking control, i) when the timegap is smaller than a first reference timegap and the relative speed is smaller than a first reference relative speed, ii) when the at least one TTC is smaller than a first reference TTC, iii) when the timegap is smaller than a second reference timegap greater than the first reference timegap, the at least one TTC is smaller than a second reference TTC greater than the first reference TTC, and the relative speed is smaller than a first emergency relative speed smaller than the first reference relative speed, or iv) when a driving speed of the ego vehicle increases while performing the coasting control.

* * * * *